United States Patent
Yi et al.

(10) Patent No.: US 10,588,160 B2
(45) Date of Patent: Mar. 10, 2020

(54) METHOD FOR HANDLING AN ID COLLISION FOR A D2D COMMUNICATION SYSTEM AND DEVICE THEREFOR

(71) Applicant: LG ELECTRONICS INC., Seoul (KR)

(72) Inventors: Seungjune Yi, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/758,590

(22) PCT Filed: Sep. 2, 2016

(86) PCT No.: PCT/KR2016/009865
§ 371 (c)(1),
(2) Date: Mar. 8, 2018

(87) PCT Pub. No.: WO2017/052103
PCT Pub. Date: Mar. 30, 2017

(65) Prior Publication Data
US 2018/0249524 A1    Aug. 30, 2018

Related U.S. Application Data

(60) Provisional application No. 62/221,115, filed on Sep. 21, 2015.

(51) Int. Cl.
H04W 74/08    (2009.01)
H04W 40/24    (2009.01)
(Continued)

(52) U.S. Cl.
CPC ..... *H04W 74/0858* (2013.01); *H04L 61/2038* (2013.01); *H04L 61/2092* (2013.01);
(Continued)

(58) Field of Classification Search
CPC ......... H04W 74/0816; H04W 74/0825; H04W 74/0841; H04W 74/085; H04W 74/0858;
(Continued)

(56) References Cited

U.S. PATENT DOCUMENTS

2013/0040677 A1    2/2013 Lee et al.
2013/0064187 A1    3/2013 Patil et al.
(Continued)

FOREIGN PATENT DOCUMENTS

| EP | 0928527 A2 | 2/1999 |
| WO | 2014058223 A2 | 4/2014 |
| WO | 2015115748 A1 | 8/2015 |

OTHER PUBLICATIONS

R2-153769: 3GPP TSG RAN WG2 #91, Beijing, P.R. China, Aug. 24-28, 2015, "Considerations on the ProSe Layer-2 ID conflict issue," ZTE, pp. 1-5.

(Continued)

*Primary Examiner* — Ashley Shivers
(74) *Attorney, Agent, or Firm* — Denton US LLP

(57) ABSTRACT

The present invention relates to a wireless communication system. More specifically, the present invention relates to a method and a device for handling an ID collision for D2D communication system, the method performed by a first UE comprising: generating a specific ID of the first UE when the first UE is to communicate with a second UE, transmitting a notification message including the specific ID to an eNB, receiving a response message in response to the notification message from the eNB, and generating another ID different from the specific ID if the response message indicates collision of the specific ID.

20 Claims, 9 Drawing Sheets

(51) Int. Cl.
| | |
|---|---|
| *H04W 76/18* | (2018.01) |
| *H04W 76/14* | (2018.01) |
| *H04W 88/04* | (2009.01) |
| *H04L 29/12* | (2006.01) |
| *H04W 8/00* | (2009.01) |
| *H04W 8/26* | (2009.01) |
| *H04W 88/02* | (2009.01) |
| *H04W 4/80* | (2018.01) |
| *H04W 76/11* | (2018.01) |
| *H04W 84/22* | (2009.01) |
| *H04W 84/04* | (2009.01) |
| *H04W 88/08* | (2009.01) |
| *H04W 80/02* | (2009.01) |
| *H04W 92/18* | (2009.01) |

(52) U.S. Cl.
CPC ........... *H04L 61/6022* (2013.01); *H04W 4/80* (2018.02); *H04W 8/005* (2013.01); *H04W 8/26* (2013.01); *H04W 40/246* (2013.01); *H04W 76/11* (2018.02); *H04W 76/14* (2018.02); *H04W 76/18* (2018.02); *H04W 88/02* (2013.01); *H04W 88/04* (2013.01); *H04W 80/02* (2013.01); *H04W 84/042* (2013.01); *H04W 84/22* (2013.01); *H04W 88/08* (2013.01); *H04W 92/18* (2013.01)

(58) Field of Classification Search
CPC ..... H04W 76/14; H04W 76/18; H04W 8/005; H04W 40/246
See application file for complete search history.

(56) References Cited

U.S. PATENT DOCUMENTS

| | | | |
|---|---|---|---|
| 2013/0242866 | A1 | 9/2013 | Lin et al. |
| 2014/0295868 | A1* | 10/2014 | Lee ................. H04W 76/27 455/452.1 |
| 2015/0056983 | A1 | 2/2015 | Cho et al. |
| 2016/0066211 | A1* | 3/2016 | Nagata ............. H04W 8/005 455/434 |
| 2016/0212780 | A1* | 7/2016 | Stojanovski ....... H04W 76/14 |
| 2016/0242152 | A1* | 8/2016 | Yu ..................... H04W 76/14 |
| 2017/0094702 | A1* | 3/2017 | Yasukawa ......... H04W 76/11 |
| 2018/0035477 | A1* | 2/2018 | Van Phan ......... H04W 76/14 |
| 2018/0092017 | A1* | 3/2018 | Freda ............... H04W 76/14 |

OTHER PUBLICATIONS

XP050130742: 3GPP TSG RAN WG2 #51, Denver, Colorado, Feb. 13-17, 2006, IPWireless, "Initial Cell Access Procedure in LTE," pp. 1-18.

* cited by examiner

[Fig. 1]
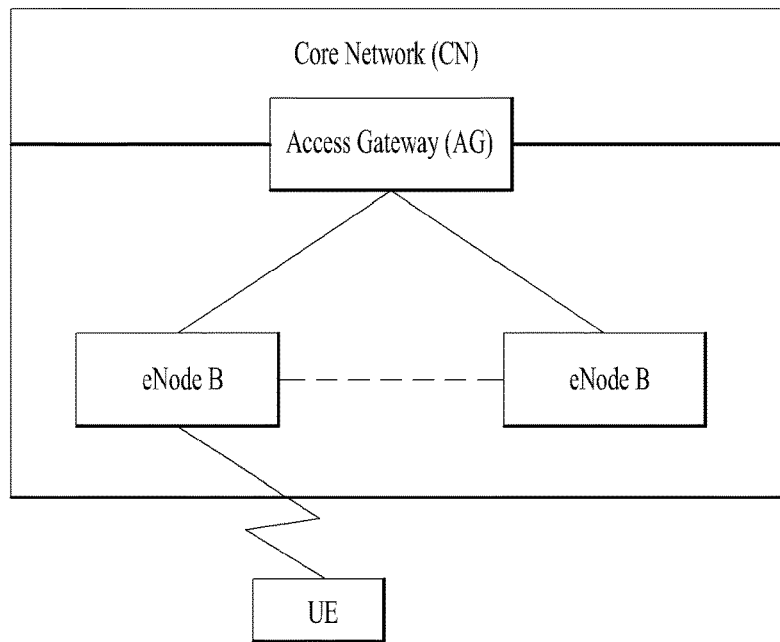
[Fig. 2A]
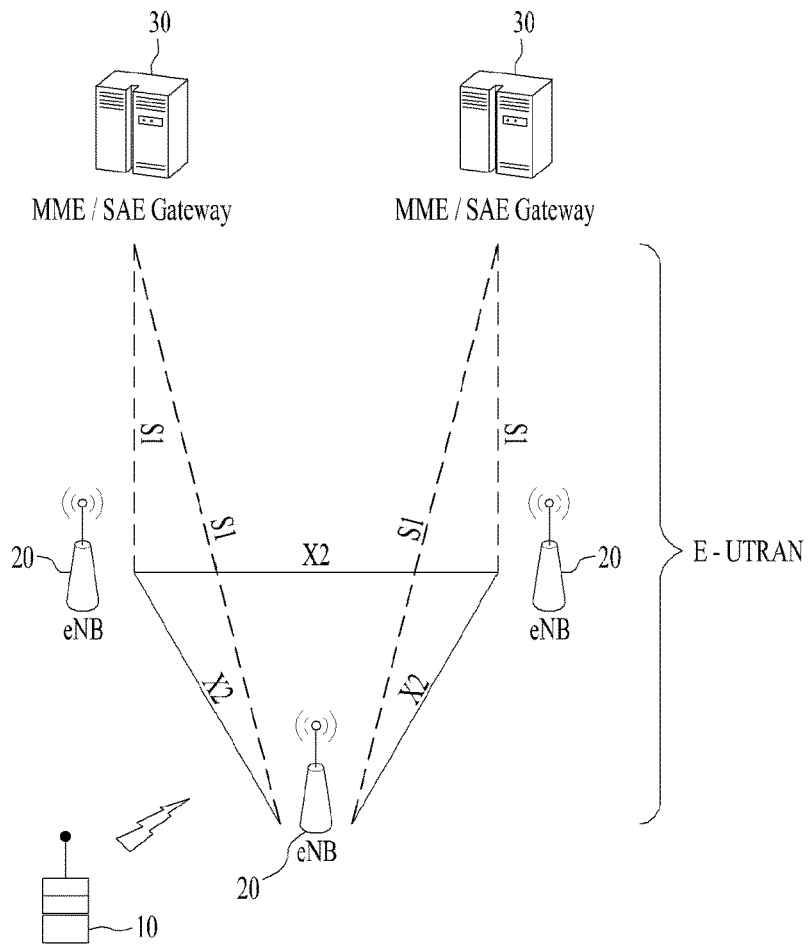

[Fig. 2B]
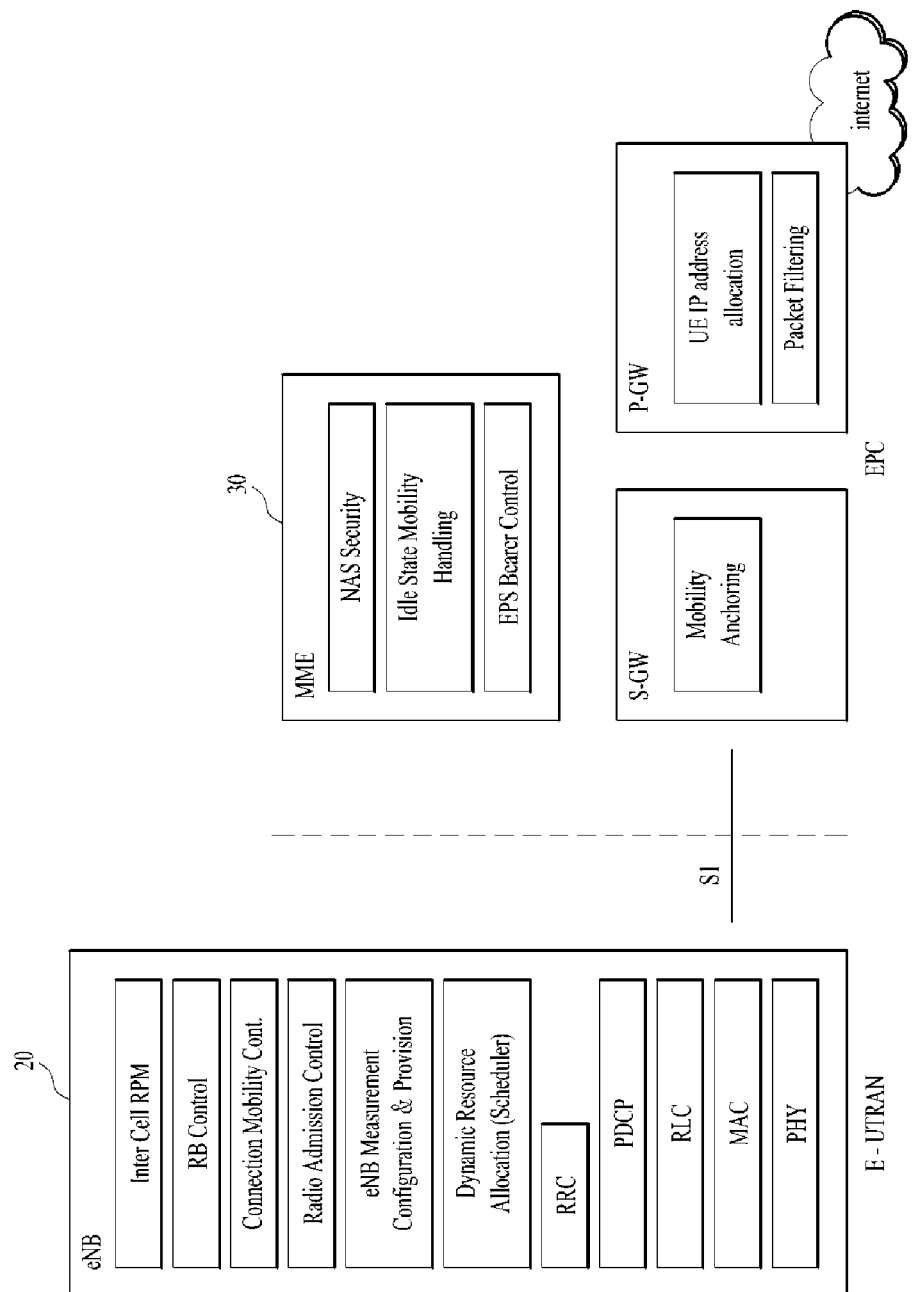

[Fig. 3]
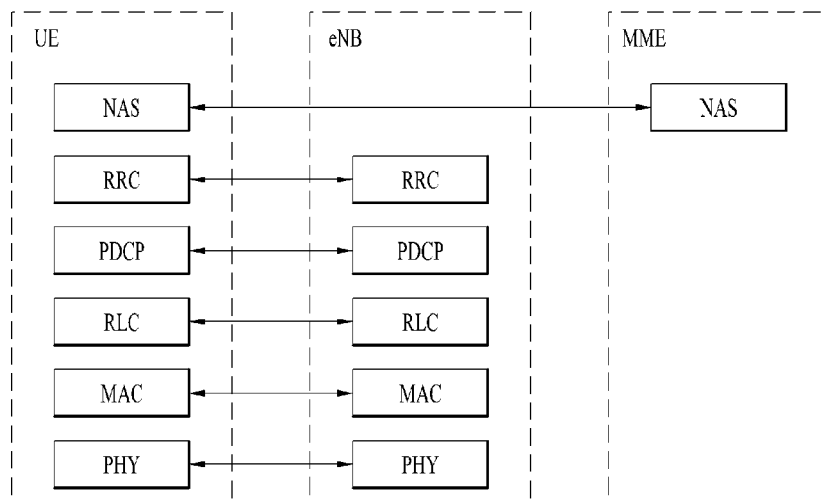
(a) Control-Plane Protocol Stack
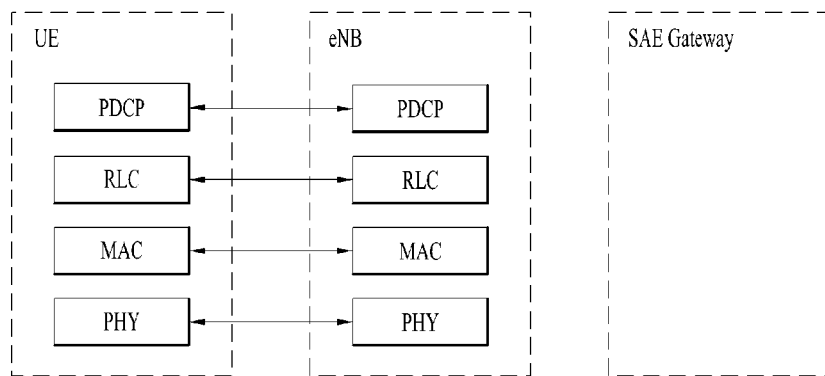
(b) User-Plane Protocol Stack
[Fig. 4]
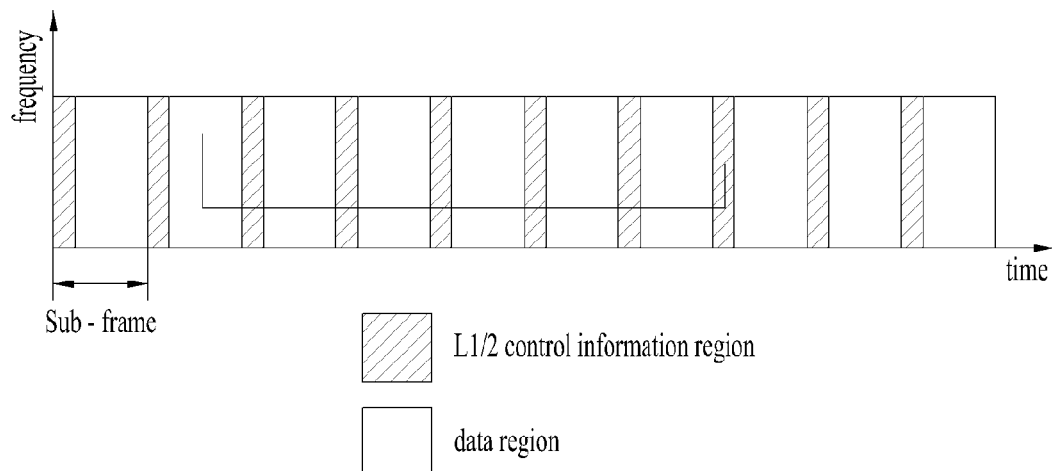

[Fig. 5]
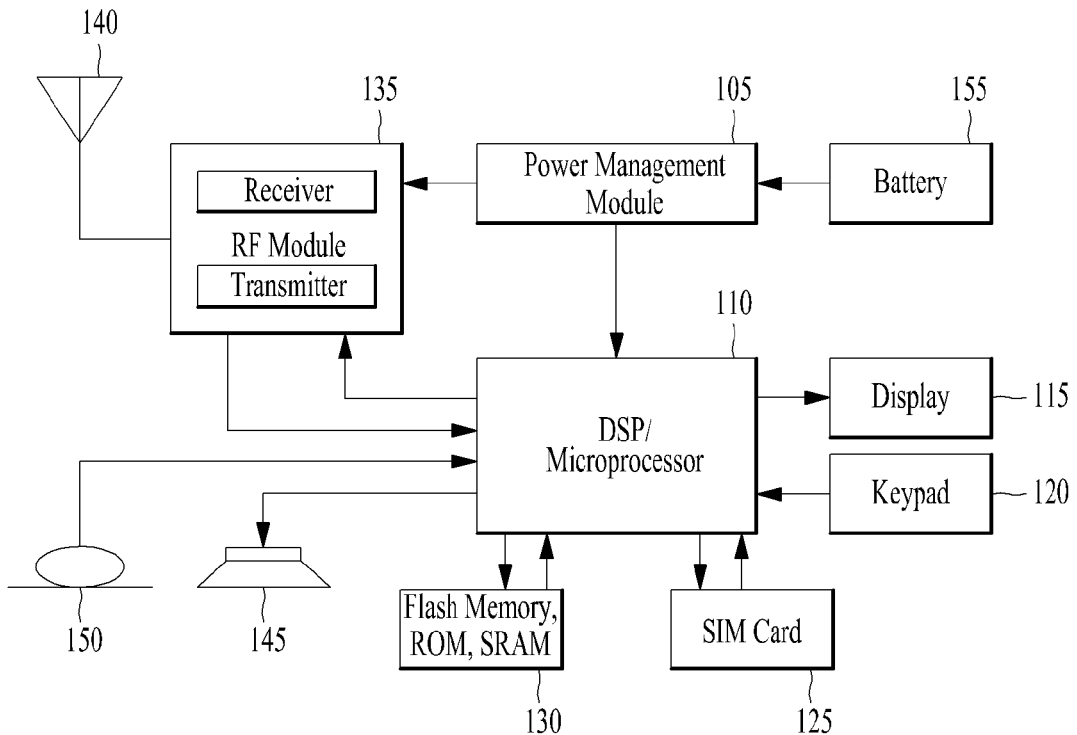
[Fig. 6]
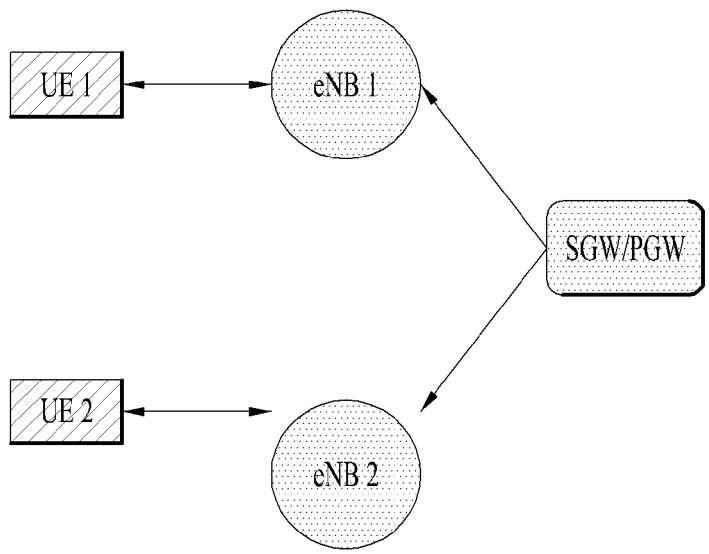

[Fig. 7]
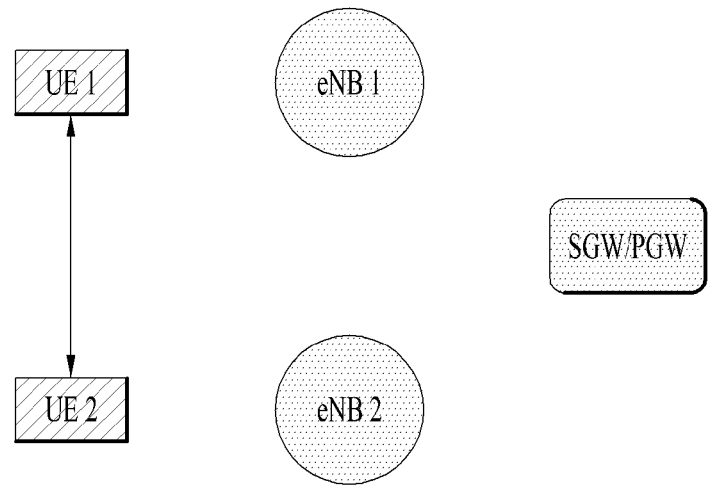
[Fig. 8]
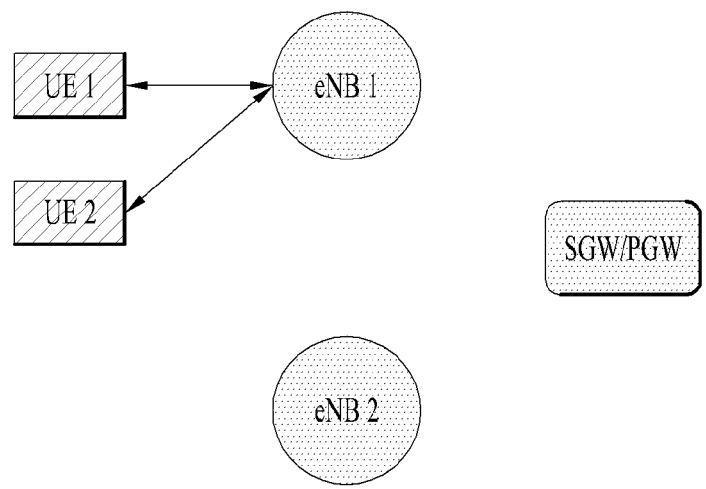

[Fig. 9]
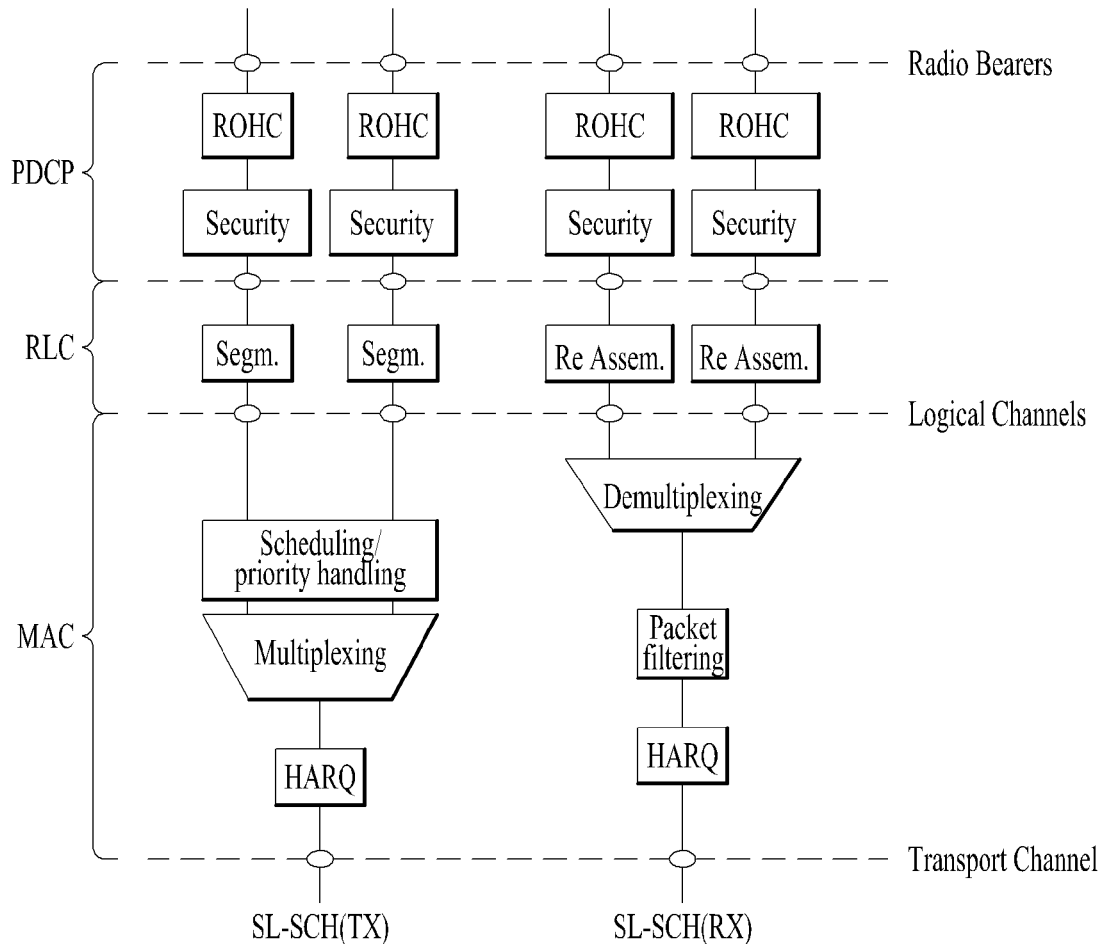
[Fig. 10A]
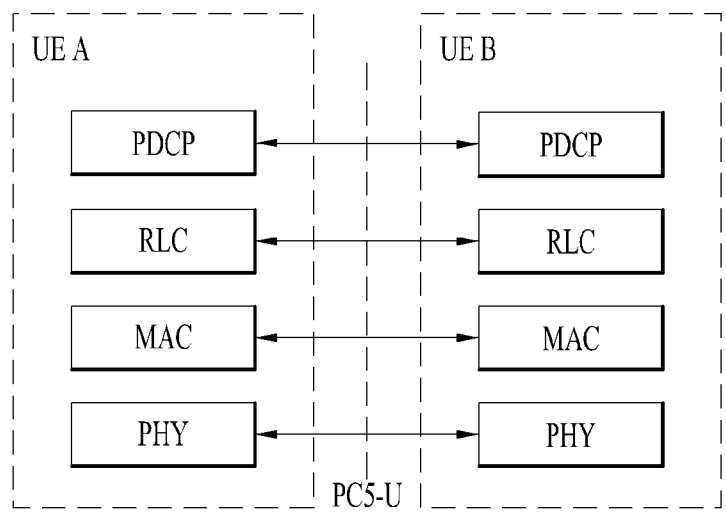

[Fig. 10B]
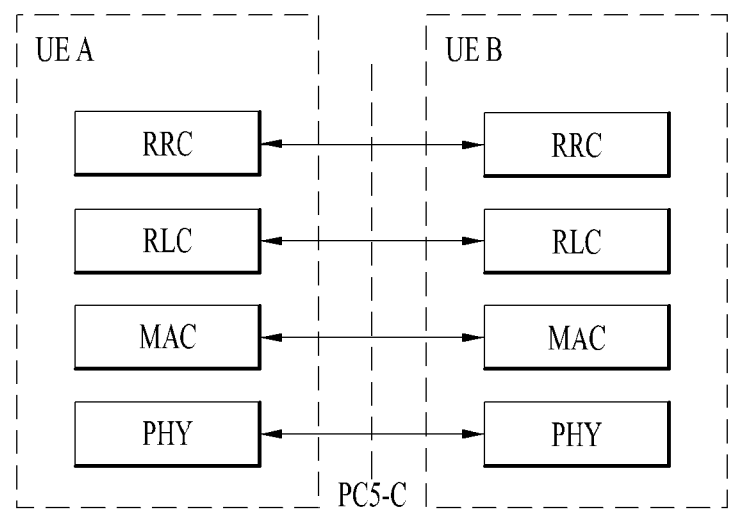

[Fig. 11]
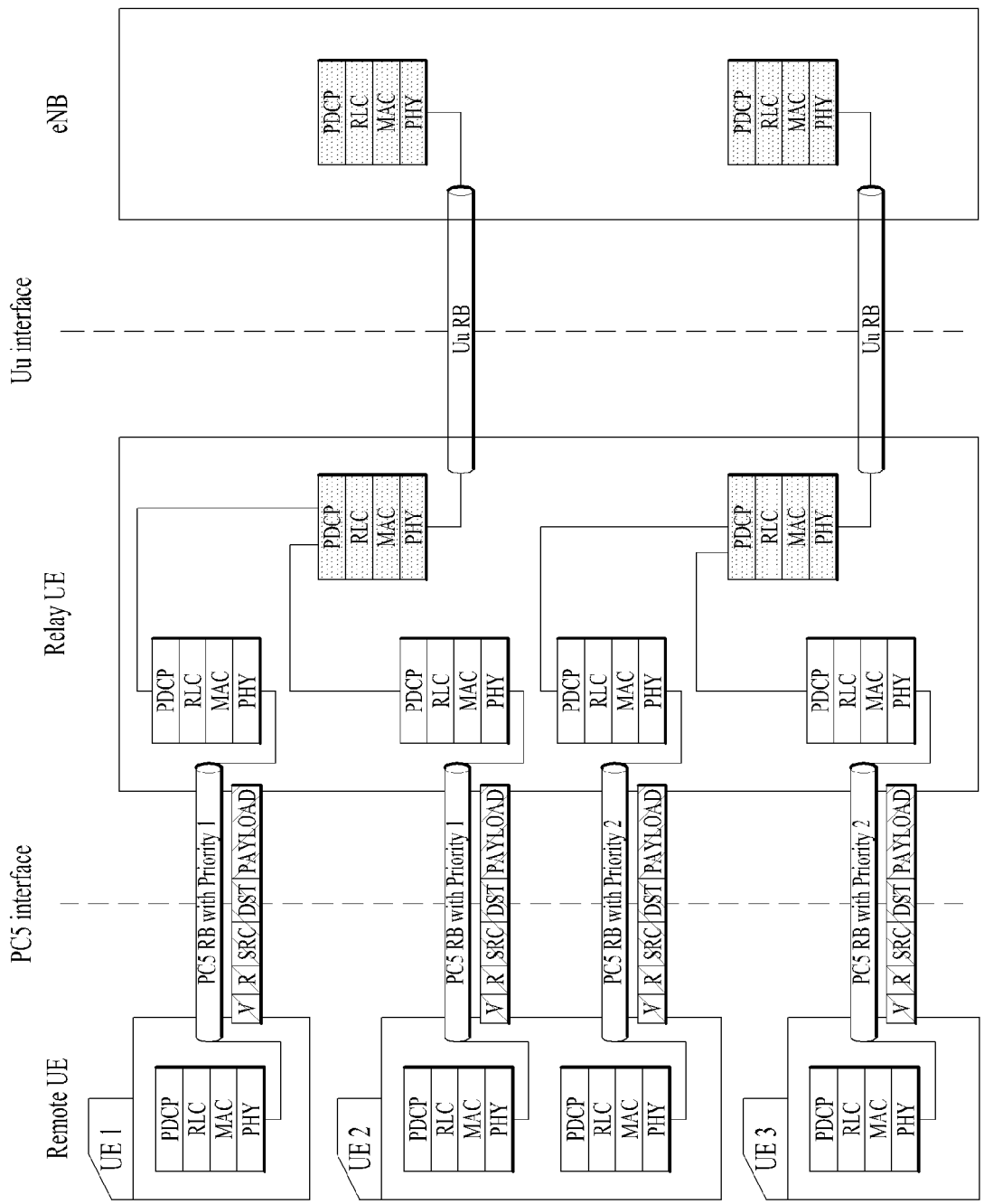

[Fig. 12]
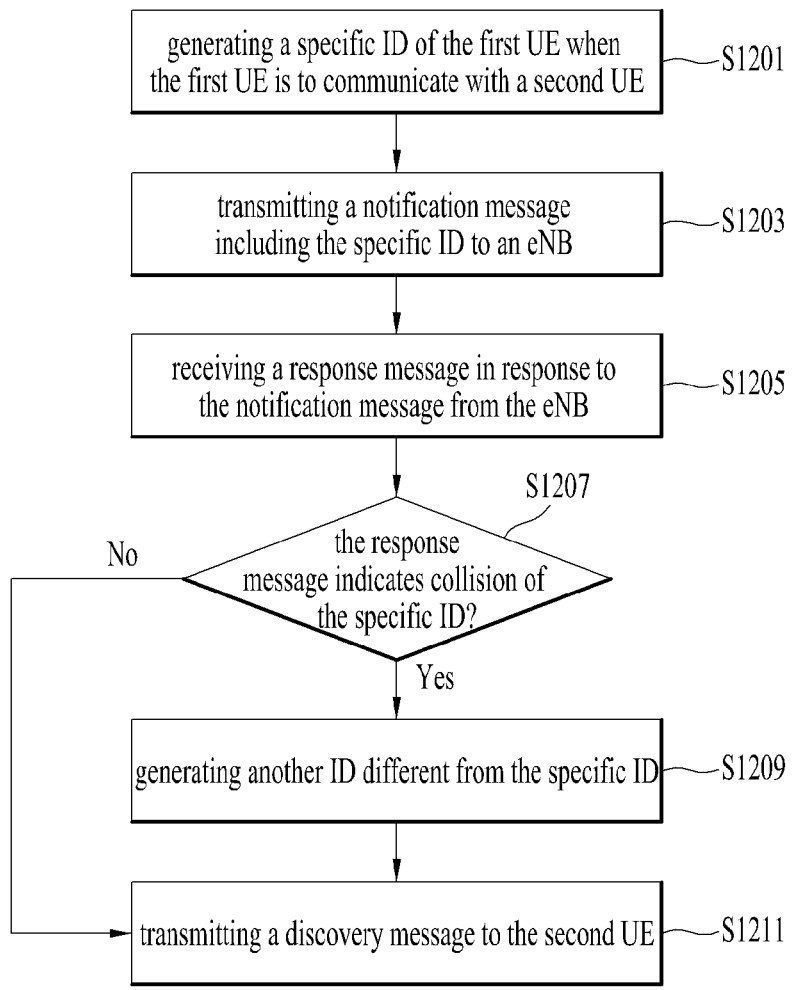
[Fig. 13]
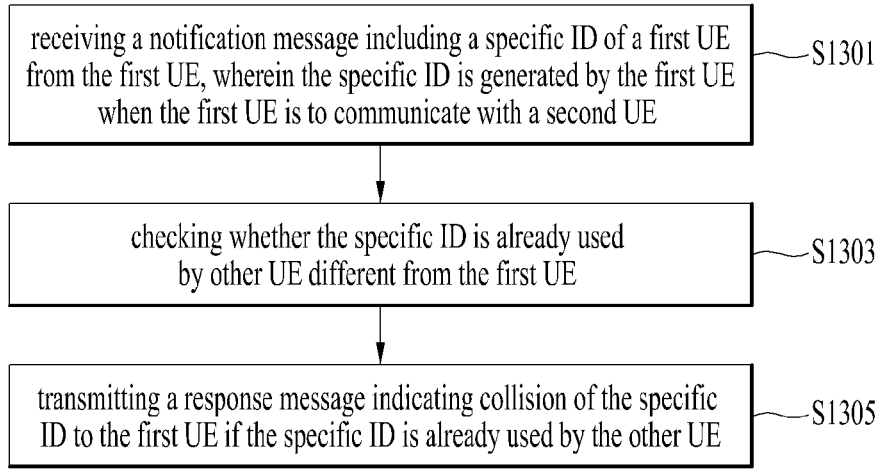

METHOD FOR HANDLING AN ID COLLISION FOR A D2D COMMUNICATION SYSTEM AND DEVICE THEREFOR

This application is a 35 USC § 371 National Stage entry of International Application No. PCT/KR2016/009865 filed on Sep. 2, 2016, and claims priority to U.S. Provisional Application No. 62/221,115 filed on Sep. 21, 2015, all of which are hereby incorporated by reference in their entireties as if fully set forth herein.

TECHNICAL FIELD

The present invention relates to a wireless communication system and, more particularly, to a method for handling an ID (Identifier) collision for a D2D (Device to Device) communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Device to device (D2D) communication refers to the distributed communication technology that directly transfers traffic between adjacent nodes without using infrastructure such as a base station. In a D2D communication environment, each node such as a portable terminal discovers user equipment physically adjacent thereto and transmits traffic after setting communication session. In this way, since D2D communication may solve traffic overload by distributing traffic concentrated into the base station, the D2D communication may have received attention as the element technology of the next generation mobile communication technology after 4G. For this reason, the standard institute such as 3GPP or IEEE has proceeded to establish the D2D communication standard on the basis of LTE-A or Wi-Fi, and Qualcomm has developed their own D2D communication technology.

It is expected that the D2D communication contributes to increase throughput of a mobile communication system and create new communication services. Also, the D2D communication may support proximity based social network services or network game services. The problem of link of a user equipment located at a shade zone may be solved by using a D2D link as a relay. In this way, it is expected that the D2D technology will provide new services in various fields.

The D2D communication technologies such as infrared communication, ZigBee, radio frequency identification (RFID) and near field communications (NFC) based on the RFID have been already used. However, since these technologies support communication only of a specific object within a limited distance (about 1 m), it is difficult for the technologies to be regarded as the D2D communication technologies strictly.

Although the D2D communication has been described as above, details of a method for transmitting data from a plurality of D2D user equipments with the same resource have not been suggested.

DISCLOSURE OF INVENTION

Technical Problem

An object of the present invention devised to solve the problem lies in a method and device for a method for handling an ID collision for a D2D communication system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

In order to handle the collision of ProSe Layer 2 ID between multiple Relay UEs, it is invented that a relay UE transmits a ProSe-ID notification message to an eNB, and the eNB transmits a ProSe-ID collision notification message to the Relay UE in response to the ProSe-ID notification message.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is an example of default data path for a normal communication;

FIGS. 7 and 8 are examples of data path scenarios for a proximity communication;

FIG. 9 is a conceptual diagram illustrating for a Layer 2 Structure for Sidelink;

FIG. 10A is a conceptual diagram illustrating for User-Plane protocol stack for ProSe Direct Communication, and FIG. 10B is Control-Plane protocol stack for ProSe Direct Communication;

FIG. 11 is an example for PC5 interface between remote UEs and a relay UE;

FIG. 12 is a diagram for a Relay UE operation in a D2D communication system according to embodiments of the present invention; and FIG. 13 is a diagram for an eNB operation in a D2D communication system according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals)

FIG. 6 is an example of default data path for communication between two UEs. With reference to FIG. 6, even when two UEs (e.g., UE1, UE2) in close proximity communicate with each other, their data path (user plane) goes via the operator network. Thus a typical data path for the communication involves eNB(s) and/or Gateway(s) (GW(s)) (e.g., SGW/PGW).

FIGS. 7 and 8 are examples of data path scenarios for a proximity communication. If wireless devices (e.g., UE1, UE2) are in proximity of each other, they may be able to use a direct mode data path (FIG. 7) or a locally routed data path (FIG. 8). In the direct mode data path, wireless devices are connected directly each other (after appropriate procedure(s), such as authentication), without eNB and SGW/PGW. In the locally routed data path, wireless devices are connected each other through eNB only.

FIG. 9 is a conceptual diagram illustrating for a Layer 2 structure for Sidelink Sidelink communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform sidelink communication.

In order to perform synchronization for out of coverage operation UE(s) may act as a synchronization source by transmitting Sidelink Broadcast Control Channel (SBCCH) and a synchronization signal. SBCCH carries the most essential system information needed to receive other sidelink channels and signals. SBCCH along with a synchronization signal is transmitted with a fixed periodicity of 40 ms. When the UE is in network coverage, the contents of SBCCH are derived from the parameters signalled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission. There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data. Sidelink control information indicates a Layer 1 ID and characteristics of the transmissions (e.g. MCS, location of the resource(s) over the duration of Sidelink Control period, timing alignment).

The UE performs transmission and reception over Uu and PC5 with the following decreasing priority order:
 Uu transmission/reception (highest priority);
 PC5 sidelink communication transmission/reception;
 PC5 sidelink discovery announcement/monitoring (lowest priority).

FIG. 10A is a conceptual diagram illustrating for User-Plane protocol stack for ProSe Direct Communication, and FIG. 10B is Control-Plane protocol stack for ProSe Direct Communication.

FIG. 10A shows the protocol stack for the user plane, where PDCP, RLC and MAC sublayers (terminate at the other UE) perform the functions listed for the user plane (e.g. header compression, HARQ retransmissions). The PC5 interface consists of PDCP, RLC, MAC and PHY as shown in FIG. 10A.

User plane details of ProSe Direct Communication: i) there is no HARQ feedback for sidelink communication, ii) RLC Unacknowledged mode (UM) is used for sidelink communication, iii) RLC UM is used for sidelink communication, iv) a receiving RLC UM entity used for sidelink communication does not need to be configured prior to reception of the first RLC UM Mode Data (UMD) PDU, and v) Robust Header Compression (ROHC) Unidirectional Mode is used for header compression in PDCP for sidelink communication.

A UE may establish multiple logical channels. LCID included within the MAC subheader uniquely identifies a logical channel within the scope of one Source Layer-2 ID and ProSe Layer-2 Group ID combination. Parameters for logical channel prioritization are not configured. The Access stratum (AS) is provided with the ProSe PerPacket Priority (PPPP) of protocol data unit transmitted over PC5 interface by higher layer. SL-RNTI is an unique identification used for ProSe Direct Communication Scheduling.

The Source Layer-2 ID identifies the sender of the data in sidelink communication. The Source Layer-2 ID is 24 bits long and is used together with Destination Layer-2 ID and LCID for identification of the RLC UM entity and PDCP entity in the receiver.

The destination Layer-2 ID identifies the target of the data in sidelink communication. The Destination Layer-2 ID is 24 bits long and is split in the MAC layer into two bit strings: i) One bit string is the LSB part (8 bits) of Destination Layer-2 ID and forwarded to physical layer as Group Destination ID. This identifies the target of the intended data in sidelink control information and is used for filtering of packets at the physical layer. And ii) Second bit string is the MSB part (16 bits) of the Destination Layer-2 ID and is carried within the MAC header. This is used for filtering of packets at the MAC layer.

No Access Stratum signalling is required for group formation and to configure Source Layer-2 ID, Destination Layer-2 ID and Group Destination ID in the UE. These identities are either provided by higher layer or derived from identities provided by higher layer. In case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer. In case of one-to-one communications, higher layer provides Source Layer-2 ID and Destination Layer-2 ID.

FIG. 10B shows the protocol stack for the control plane.

A UE does not establish and maintain a logical connection to receiving UEs prior to one-to-many a sidelink communication. Higher layer establish and maintain a logical connection for one-to-one sidelink communication including ProSe UE-to-Network Relay operation. The Access Stratum protocol stack for SBCCH in the PC5 interface consists of RRC, RLC, MAC and PHY as shown below in FIG. 10B.

FIG. 11 is an example for PC5 interface between remote UEs and a relay UE.

In ProSe, a UE communicates with other UEs directly over PC5 interface.

By introducing a Relay UE for UE-to-network (NW) relay, a remote UE transmits data to an eNB via the Relay UE, and the eNB transmits data to the remote UE via the Relay UE. That is, the Relay UE relays data to/from eNB. The Relay UE for UE-to-NW relay may be a UE that provides functionality to support connectivity to "unicast" services for Remote UE(s).

As data transfer between the remote UE and the Relay UE is ProSe communication, the Relay UE is communicating with the remote UE over PC5 interface. In the meantime, as data transfer between the Relay UE and the eNB is a normal uplink/downlink (Uu) communication, the Relay UE is communicating with the eNB over Uu interface. This implies that if data has higher priority in PC5 communication, it should also be higher prioritized in Uu communication.

Regarding UE-to-NW relay connection establishment, there are some agreements as followings: i) Authorization of remote UEs is done by higher layers, ii) A relay UE performing relay communication has to be in RRC connected mode, iii) After receiving a layer-2 link establishment request from a remote UE, the relay UE informs the eNB using UESidelinkInformation. The relay UE indicates in the message that the request is for relay one-to-one communication purposes. The eNB similar to rel-12 can chose to provide or not provide resources for relay communication. iv) RAN2 will not define any layer-2 link establishment messages.

Regarding Sidelink Communication via ProSe UE-to-NW Relay, ProSe UE-to-NW Relay provides generic L3 forwarding function that can relay any type of IP traffic between the Remote UE and the network. One-to-one ProSe Direct Communication is used between the Remote UE and the ProSe UE-to-NW Relay. The Remote UE is authorised by upper layer and can be in-coverage or out-of-coverage of EUTRAN for UE-to-Network Relay discovery, selection and communication. The ProSe UE-to-Network Relay is always in-coverage of EUTRAN. The eNB controls whether the UE can act as a ProSe UE-to-Network Relay. If the eNB broadcast any information associated to ProSe UE-to-NW Relay operation then ProSe UE-to-NW Relay operation is supported in the cell. The eNB may indicate that the ProSe UE-to-NW Relay operation is supported and provides transmission and reception resource pool(s) for ProSe UE-to-Network Relay discovery in broadcast signalling. The eNB may broadcasts a minimum and/or a maximum Uu link quality (RSRP/RSRQ) thresholds that the ProSe UE-to-Network Relay UE needs to respect to autonomously start/stop the UE-to-NW Relay discovery procedure using the broadcasted threshold(s). The eNB may configure none, one of the threshold or both thresholds. If the eNB broadcast that the ProSe UE-to-NW Relay operation is supported, but does not broadcast transmission resource pool for ProSe-UE-to-Network Relay discovery, then UE can initiate request for ProSe-UE-to-Network Relay discovery resources by dedicated signalling. The eNB may configure the UE to become a ProSe-UE-to-NW Relay by dedicated signalling. If the ProSe-UE-to-Network Relay is initiated by broadcast signalling, it can perform ProSe UE-to-NW Relay discovery when in RRC_IDLE. If the ProSe UE-to-NW Relay is initiated by dedicated signalling, it can perform relay discovery as long as it is in RRC_CONNECTED.

A UE-to-NW Relay performing one-to-one sidelink communication has to be in RRC_CONNECTED. After receiving a layer-2 link establishment request (upper layer message) from the Remote UE, the ProSe UE-to-NW Relay indicates to the eNB that it intends to perform ProSe UE-to-NW Relay one-to-one communication. The eNB may provide resources for ProSe UE-to-NW Relay one-to-one communication.

The Remote UE performs radio measurement at PC5 interface and uses it for ProSe UE-to-NW Relay selection and reselection along with higher layer criterion. A ProSe UE-to-NW Relay is considered suitable in terms of radio criteria if the PC5 link quality exceeds configured threshold (pre-configured or provided by eNB). The Remote UE may also trigger ProSe UE-to-NW Relay reselection when it receives a layer-2 link release message (upper layer message) from ProSe UE-to-NW Relay. In RRC_CONNECTED state, after selecting a ProSe UE-to-NW Relay, the Remote UE informs to the eNB that it intends to use ProSe UE-to-NW Relay one-to-one communication. The eNB may provide resources for ProSe UE-to-NW Relay one-to-one communication.

When the Remote UE is in-coverage, i) Transmission resources for ProSe UE-to-NW Relay discovery are provided by the eNB using broadcast for RRC_IDLE state and dedicated signalling for RRC_CONNECTED state, and ii) Monitoring resources for ProSe UE-to-NW Relay discovery are provided by the eNB using broadcast signalling.

The remote UE can decide when to start monitoring for ProSe UE-to-NW Relay discovery. The Remote UE can transmit ProSe UE-to-NW Relay discovery solicitation message while in RRC_IDLE or in RRC_CONNECTED depending on the configuration of resources for ProSe UE-to-NW Relay discovery. The eNB may configure a threshold to control transmission of ProSe UE-to-NW Relay discovery solicitation message from the Remote UE. If the threshold is configured, the Remote UE is allowed to transmit ProSe UE-to-NW Relay discovery solicitation message only if the Uu link quality at the Remote UE is below the configured threshold.

As described above, in Prose Relay, a Remote UE transmits/receives data to/from an eNB via a Relay UE. Each UE in ProSe generates its own ProSe Layer 2 ID by itself before executing ProSe communication. This implies that multiple Relay UEs may generate same ProSe Layer 2 ID. In case multiple Relay UEs generate the same ProSe Layer 2 ID, when a Remote UE receives discovery message from the multiple Relay UEs, the Remote UE cannot distinguish from which Relay UE the discovery message is received. In this case, the Remote UE may consider that it receives the discovery message multiple times from one Relay UE having that ProSe Layer 2 ID. Therefore, there should be a solution for the Relay UE to inform eNB of its ProSe Layer 2 ID so that the eNB detects the collision of ProSe Layer 2 ID between multiple Relay UEs.

Thus, in order to handle the collision of ProSe Layer 2 ID between multiple Relay UEs, it is invented that a relay UE transmits a ProSe-ID notification message to an eNB, and the eNB transmits a ProSe-ID collision notification message to the Relay UE in response to the ProSe-ID notification message.

The present invention may comprise two part, i) ProSe-ID notification (message) and ii) ProSe-ID collision notification (message). The ProSe-ID notification is used for the Relay UE to inform the eNB of its selected PC5 ID (e.g. ProSe-ID) together with Uu ID (e.g. C-RNTI). The ProSe-ID collision notification is used for the eNB to inform the Relay UEs of collision of their collided ProSe-IDs.

Hereinafter, the present invention will be described mainly focusing on procedure between a Relay UE and an eNB. However, the present invention is not necessarily applied only for Relay UE. That is, any type of ProSe UE can use the present invention to resolve PC5 ID collision by the eNB.

The ProSe-ID notification message may include a ProSe-ID of a Relay UE, and may be transmitted to an eNB. In the present invention, the ProSe-ID is to be used as an identification of the Relay UE when the Relay UE is to communicate with a Remote UE. The ProSe-ID may be a ProSe Layer 2 ID.

The Relay UE may generate its ProSe-ID i) after the Relay UE receives a Layer-2 link establishment request from the remote UE, and/or ii) before starting communicating with the Remote UE.

After the Relay UE generates its ProSe-ID, the Relay UE informs the eNB of its ProSe-ID by sending a Prose-ID Notification to the eNB.

In some embodiments, the Prose-ID Notification includes both of the generated ProSe-ID (e.g., ProSe Layer 2 ID) and a UE ID (e.g., C-RNTI) of the Relay UE. The ProSe-ID Notification may be included in a Request message (e.g., an RRC message) which informs the eNB of ProSe UE-to-Network Relay one-to-one communication.

When the eNB receives the ProSe-ID notification message, the eNB may transmit the ProSe-ID collision notification message to the Relay UE, in response to the ProSe-ID notification message.

More specifically, when the eNB receives the Request message including both of the ProSe-ID and the UE ID from the Relay UE, the eNB checks whether the ProSe-ID included in the Request message is a collided ProSe-ID or not. The eNB may consider that the ProSe-ID is the collided ProSe-ID: i) if the other Relay UE is already using the ProSe-ID in ProSe UE-to-Network Relay one-to-one communication, or ii) if the eNB receives at least two Request messages from different Relay UEs, and the Request messages include the same ProSe-ID but different UE IDs.

If the eNB detects that the ProSe-ID included in the Request message is the collided ProSe-ID, the eNB transmits a ProSe-ID Change message to the Relay UE that has the collided ProSe-ID. The ProSe-ID Change message may be one of RRC/PDCP/RLC/MAC/PHY messages.

In some embodiments, The ProSe-ID Change message includes the collided ProSe-ID (i.e., the ProSe-ID of the Relay UE). Or, the ProSe-ID Change message can additionally include the UE ID of the Relay UE of which the ProSe-ID is the collided ProSe-ID.

In some embodiments, The ProSe-ID Change message can include a Change Indication which indicates the Relay UE needs to change its ProSe-ID or not.

When the Relay UE receives a ProSe-ID Change message from the eNB, the Relay UE checks whether the ProSe-ID of the Relay UE is a collided ProSe-ID or not. The Relay UE considers that its ProSe-ID is the collided ProSe-ID: i) if the received ProSe-ID Change message includes the ProSe-ID of the Relay UE, or ii) if the Change Indication of the received ProSe-ID Change message indicates that the Relay UE needs to change its ProSe-ID.

If the Relay UE considers that its ProSe-ID is the collided ProSe-ID, the Relay UE changes its ProSe-ID. When the Relay UE changes its ProSe-ID, the Relay UE selects a ProSe-ID randomly among the ProSe-IDs, or selects a ProSe-ID randomly among the ProSe-IDs except for the collided ProSe-ID.

After the Relay UE changes its ProSe-ID, the Relay UE may transmit the Prose-ID Notification to the eNB by including the newly selected ProSe-ID and the UE ID, and/or transmit a discovery message to the remote UE.

More specific examples regarding the ProSe-ID notification message/ProSe-ID collision notification message will be described with reference to FIG. 12 (for Relay UE operation) and FIG. 13 (for eNB operation).

FIG. 12 is a diagram for a Relay UE operation in a D2D communication system according to embodiments of the present invention.

In descriptions of the present exemplary embodiment, a first UE may be a Relay UE, and a second UE may be a Remote UE.

Referring to FIG. 12, the first UE generates a specific identifier (ID) of the first UE when the first UE is to communicate with a second UE (S1201). Here, the specific ID may be a Proximity based Services (ProSe) Layer 2 Identifier. In some embodiments, the first UE may generate the specific ID after the first UE receives a Layer-2 link establishment request from the second UE, and/or before starting communicating with the second UE.

After generating the specific ID, the first UE transmits a notification message (e.g., the ProSe-ID notification message) including the specific ID to an eNB (S1203). Preferably, the notification message can further include a Cell-Radio Network Temporary Identifier (C-RNTI) of the first UE. In some embodiments, the notification message may be included in a RRC message which informs the eNB of ProSe UE-to-Network Relay one-to-one communication.

In response to the notification message, the first UE receives a response message (e.g., the ProSe-ID collision notification message) from the eNB (S1205). Here, the response message may further include the specific ID. In addition, the response message may further include a Change Indication which indicates the first UE needs to change the specific ID or not.

After receiving the response message, the first UE may check whether the response message indicates collision of the specific ID or not (S1207). That is, the first UE may check whether there is a need to change the specific ID or not.

In some embodiments, the checking is performed by checking whether the response message includes the specific ID (i.e., ProSe Layer-2 ID generated by the first UE), or by checking whether the Change Indication of the response message indicates that the first UE needs to change the specific ID.

If the response message indicates collision of the specific ID, the first UE generates another ID different from the specific ID if the response message indicates collision of the specific ID (S1209). Here, the another ID may be a ProSe Layer 2 ID.

In some embodiments, when the first UE generates the another ID, the first UE selects the another ID randomly among a plurality of ProSe Layer 2 Identifiers except for the specific ID.

After generating the another ID, the first UE may transmit a discovery message to the second UE (S1211). In this case, the first UE may transmit a discovery message using the another ID, not using the specific ID.

Meanwhile, in some embodiments, the first UE may transmit another notification message (e.g., the ProSe-ID notification message) including the another ID to an eNB, between the step S1209 and the step S1211, If the response message indicates collision of the specific ID.

Otherwise, if the response message does not indicate collision of the specific ID, the first UE may transmit a discovery message to the second UE without generating the another ID (S1211). In this case, the first UE may transmit a discovery message using the specific ID.

FIG. 13 is a diagram for an eNB operation in a D2D communication system according to embodiments of the present invention.

In descriptions of the present exemplary embodiment, a first UE may be a Relay UE, a second UE may be a Remote UE, and the other UE may be other Relay UE(s) except the first UE.

Referring to FIG. 13, the eNB receives a notification message (e.g., the ProSe-ID notification message) including a specific identifier (ID) of a first user equipment (UE) from the first UE, wherein the specific ID is generated by the first UE when the first UE is to communicate with a second UE (S1301). Here, the specific ID may be a ProSe Layer 2 Identifier. Preferably, the notification message can further include a C-RNTI of the first UE. In some embodiments, the notification message may be included in a RRC message which informs the eNB of ProSe UE-to-Network Relay one-to-one communication.

After receiving the notification message, the eNB checks whether the specific ID is already used by other UE different from the first UE (S1303). That is, the eNB checks whether the specific ID collides with the other UE's ProSe Layer 2 ID or not.

If the specific ID is already used by the other UE, the eNB transmits a response message (e.g., the ProSe-ID collision notification message) indicating collision of the specific ID to the first UE (S1305). Preferably, the response message includes the specific ID. In addition, the response message may further include a Change Indication which indicates the first UE needs to change the specific ID or not.

After transmitting the response message, the eNB may receive another notification message (e.g., another ProSe-ID notification message) including another ID different from the specific ID which is generated by the first UE. In this case, the eNB may also check whether the another ID is already used by other UE different from the first UE.

In summary, in the present invention, it is possible to handle the collision of ProSe Layer 2 ID between multiple Relay UEs, by a method that a relay UE transmits a ProSe-ID notification message to an eNB, and the eNB transmits a ProSe-ID collision notification message to the Relay UE in response to the ProSe-ID notification message.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a first user equipment (UE) operating in a wireless communication system, the method comprising:
   generating a specific identifier (ID) of the first UE when the first UE is to communicate with a second UE;
   transmitting a notification message including the specific ID to an eNB to inform communication between the first UE and the second UE;
   receiving a response message in response to the notification message from the eNB; and
   when the response message indicates collision of the specific ID by including a UE ID of the first UE of which the specific ID is collided, generating another ID different from the specific ID, otherwise, transmitting a discovery message to the second UE.

2. The method according to claim 1, wherein the notification message further include a Cell-Radio Network Temporary Identifier (C-RNTI) of the first UE.

3. The method according to claim 1, wherein each of the specific ID and the another ID is a Proximity based Services (ProSe) Layer 2 Identifier.

4. The method according to claim 1, wherein when the first UE generates the another ID, the first UE selects the another ID randomly among a plurality of ProSe Layer 2 Identifiers except for the specific ID.

5. The method according to claim 1, wherein when generating the another ID, the method further comprising:
   transmitting another notification message including the another ID to the eNB.

6. The method according to claim 1, wherein the response message further includes the specific ID.

7. A method for a base station operating in a wireless communication system, the method comprising:
   receiving a notification message informing communication between a first user equipment (UE) and a second UE form the first UE,
   wherein the notification message includes a specific identifier (ID) generated by the first UE;
   checking whether the specific ID is already used by other UE different from the first UE; and
   when the specific ID is already used by the other UE, transmitting a response message indicating collision of the specific ID to the first UE by including a UE ID of the first UE of which the specific ID is collided, otherwise, transmitting a response message without indicating collision of the specific ID to the first UE.

8. The method according to claim 7, wherein the specific identifier is a Proximity based Services (ProSe) Layer 2 Identifier.

9. The method according to claim 7, wherein the response message further includes the specific ID.

10. The method according to claim 7, further comprising:
    when the specific ID is already used by the other UE, receiving another notification message including another ID different from the specific ID which is generated by the first UE.

11. A first User Equipment (UE) for operating in a wireless communication system, the first UE comprising:
    a transmitter and a receiver; and
    a processor operably coupled to the transmitter and the receiver,
    wherein the processor is configured to:
       generate a specific identifier (ID) of the first UE when the first UE is to communicate with a second UE,
       transmit a notification message including the specific ID to an eNB to inform communication between the first UE and the second UE,
       receive a response message in response to the notification message from the eNB, and
       when the response message indicates collision of the specific ID by including a UE ID of the first UE of which the specific ID is collided, generate another ID different from the specific ID, otherwise, transmitting a discovery message to the second UE.

12. The first UE according to claim 11, wherein the notification message further include a Cell-Radio Network Temporary Identifier (C-RNTI) of the first UE.

13. The first UE according to claim 11, wherein each of the specific ID and the another ID is a Proximity based Services (ProSe) Layer 2 Identifier.

14. The first UE according to claim 11, wherein when the first UE generates the another ID, the first UE selects the another ID randomly among a plurality of ProSe Layer 2 Identifiers except for the specific ID.

15. The first UE according to claim 11, wherein when the first UE generates the another ID, the processor is further configured to:
    transmit another notification message including the another ID to the eNB.

16. The first UE according to claim 11, wherein the response message further includes the specific ID.

17. A base station for operating in a wireless communication system, the base station comprising:
    a transmitter and a receiver; and
    a processor operably coupled to the transmitter and the receiver, wherein the processor is configured to:
receive a notification message informing communication between a first user equipment (UE) and a second UE form the first UE, wherein the notification message includes a specific identifier (ID) generated by the first UE,
check whether the specific ID is already used by other UE different from the first UE, and
when the specific ID is already used by the other UE, transmit a response message indicating collision of the specific ID to the first UE by including a UE ID of the first UE of which the specific ID is collided, otherwise, transmitting a response message without indicating collision of the specific ID to the first UE.

18. The base station according to claim 17, wherein the specific identifier is a Proximity based Services (ProSe) Layer 2 Identifier.

19. The base station according to claim 17, wherein the response message further includes the specific ID.

20. The base station according to claim 17, wherein the processor is further configured to:
receive another notification message including another ID different from the specific ID which is generated by the first UE.

* * * * *